No. 844,976. PATENTED FEB. 19, 1907.
P. TESSIER.
BELT FASTENER.
APPLICATION FILED JUNE 26, 1906.
Fig. 1.
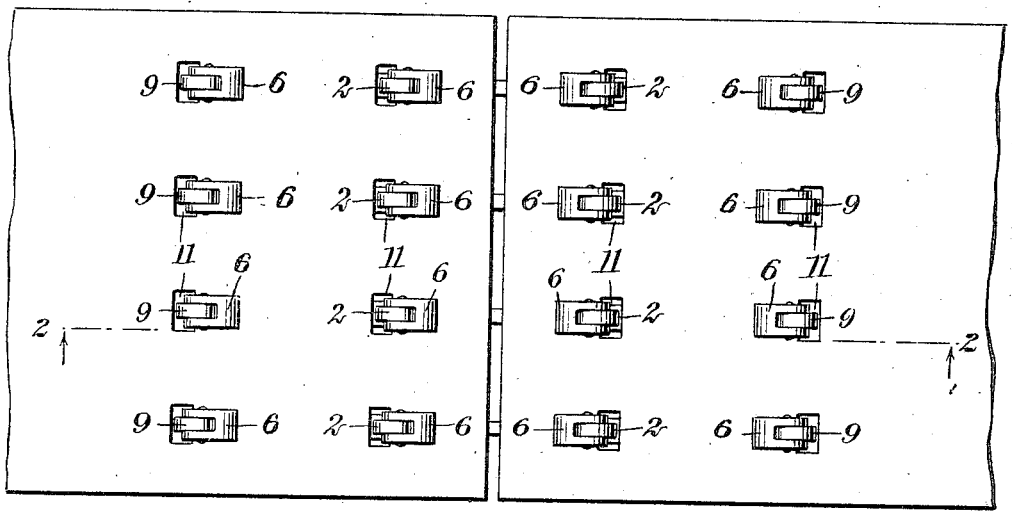
Fig. 2.
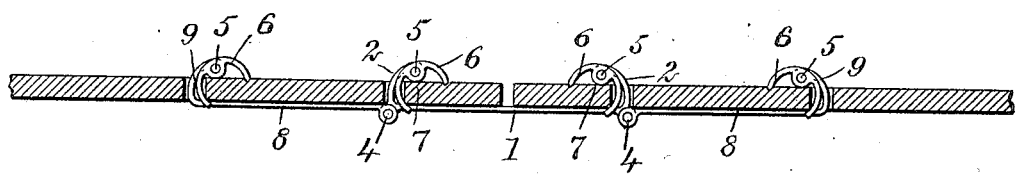
Fig. 3.
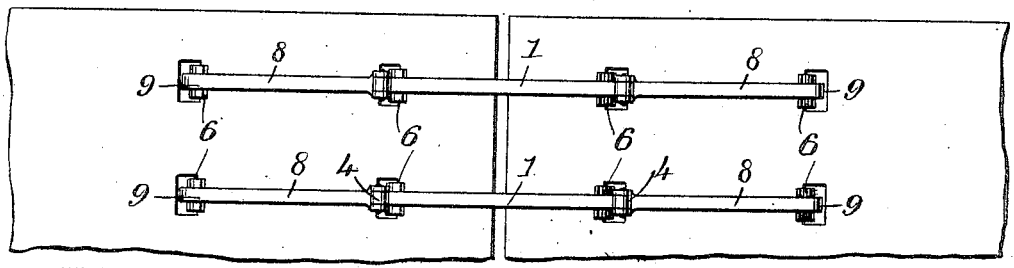
WITNESSES
Edward Thorpe
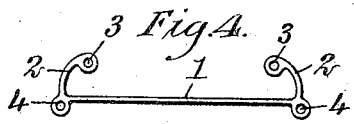
Fig. 4.
INVENTOR
Philip Tessier
BY Munn & Co
ATTORNEYS

UNITED STATES PATENT OFFICE.

PHILIP TESSIER, OF HORACE, NORTH DAKOTA.

BELT-FASTENER.

No. 844,976.  Specification of Letters Patent.  Patented Feb. 19, 1907.

Application filed June 26, 1906. Serial No. 323,462.

*To all whom it may concern:*

Be it known that I, PHILIP TESSIER, a citizen of the United States, and a resident of Horace, in the county of Cass and State of North Dakota, have invented a new and Improved Belt-Fastener, of which the following is a full, clear, and exact description.

This invention is an improved fastening means for connecting the ends of a power-belt, rendering the connection secure without injury to the normal strength of the material.

Among the objects of the invention is to provide a device of this character which can be readily applied or removed when desired and which will act to hold the ends of the belt with greater security as the tension thereon is increased.

Reference is to be had to the accompanying drawings, forming a part of this specification, in which similar characters of reference indicate corresponding parts in all the figures.

Figure 1 is a top plan view of the belt at the junction of its two ends with my improved fastening means applied thereto. Fig. 2 is a longitudinal sectional view through the belt, taken substantially on the line 2 2 of Fig. 1 and looking in the direction of the arrows. Fig. 3 is an inverted plan view of the ends of the belt with my improved fastening means applied thereto, and Fig. 4 is a detail view of one of the hook members designed to span the spliced joint.

The invention comprises a thin bar member 1, carrying at each end an upturned hook 2, having at its outer and upper end an enlarged eye 3, also enlarged eyes 4 slightly offset at the ends of the bar member, similar to the eyes of the hooks. Pivotally connected to the eyes 3 by rivets 5 are semicircular clamping members 6, bifurcated for more than one-half their length, as shown in Fig. 1, for receiving the hooks 2, and an enlargement 7, substantially midway of its length, affording sufficient metal for its pivotal connection and designed to press on the upper surface of the belt.

To each of the eyes 4 is pivotally connected thin metal bars 8, similar to the bar 1 and bifurcated at their opposed ends for receiving said eyes. The outer ends of the bars 8 are constructed with hooks 9, similar to the hooks 2, and also carry pivoted to them at their outer ends semicircular clamping members 6 of the same construction as the clamping members pivoted to the hooks 2. By this arrangement the pivotal connection of the several members will avoid any interference with the flexibility of the belt.

In applying the fastener to the belt the latter is to be provided with a series of perforations 11, preferably rectangular in contour and spaced apart a distance equal to that between the several hook members. In practice it will be found desirable to apply several of the fasteners to a single belt, depending, of course, on the tension or strain which the belt is to withstand and also on its width.

It is apparent from Fig. 2 that after the hook members and their pivotally-attached clamping means have been passed through the perforations 11 of the belt the greater the force tending to separate the belt ends the more will the upper ends of the clamping members bite into the upper surface of the belt. This will be caused by the lower edges of the perforations which engage with the clamping members turning the latter on their pivots and forcing their upper ends downward as the ends of the belt recede from each other.

It is apparent that in some cases it might be desirable to dispense with the bar members 8 and their attached mechanism, employing only the bar 1, as shown in Fig. 4, and clamping means carried at each end thereof. Also various other immaterial changes may be made without departing from the spirit of the invention, and I consider that I am entitled to such modifications as are confined within the scope of the annexed claims.

Having thus described my invention, I claim as new and desire to secure by Letters Patent—

1. In a belt-fastener, a bar member, a hook at each end thereof, a clamping member pivotally connected to each hook, a bar member pivoted to each end of said first-named bar, hooks at the outer ends of said pivotally-connected bars, and clamping means pivotally connected to said last-named hooks.

2. In a belt-fastener, a thin bar member having a hook at each end and at the same side thereof, and a substantially semicircular member pivotally connected at its center to each hook.

3. In combination with a belt having perforations in the meeting ends thereof, a fastener comprising a bar having its ends passing through said perforations in the belt, and clamping members pivotally connected to the ends of said bar and passing through said perforations, for the purpose described.

4. In combination with a belt having perforations in the meeting ends thereof, a fastener comprising a bar having its ends passing through said perforations in the belt, and curved clamping members pivotally connected to the ends of said bars and passing through said perforations, for the purpose described.

5. In a belt-fastener, a bar member having a hook at each end and at the same side thereof facing each other, curved clamping members having bifurcations therein for receiving the hooked ends of said bar, and means pivotally connecting the hooks and clamping members together.

In testimony whereof I have signed my name to this specification in the presence of two subscribing witnesses.

PHILIP TESSIER.

Witnesses:
ARTHUR B. LEE,
ADELINE E. ALWARD.